US005587523A

United States Patent [19]

Jung et al.

[11] Patent Number: 5,587,523
[45] Date of Patent: *Dec. 24, 1996

[54] ATOMIC FORCE MICROSCOPE EMPLOYING BEAM TRACKING

[75] Inventors: Pan S. Jung, Gilbert; Daphna R. Yaniv, Scottsdale, both of Ariz.

[73] Assignee: Molecular Imaging Corporation

[ * ] Notice: The term of this patent shall not extend beyond the expiration date of Pat. No. 5,440,920.

[21] Appl. No.: 427,353

[22] Filed: Feb. 15, 1995

Related U.S. Application Data

[63] Continuation of Ser. No. 190,948, Feb. 3, 1994, Pat. No. 5,440,920.
[51] Int. Cl.⁶ .................................................. G01B 5/28
[52] U.S. Cl. .............................................. 73/105
[58] Field of Search .................. 73/105; 250/306, 250/307

[56] References Cited

U.S. PATENT DOCUMENTS

| | | | |
|---|---|---|---|
| Re. 33,387 | 10/1990 | Binnig | 250/306 |
| Re. 34,331 | 8/1993 | Elings et al. | 250/306 |
| Re. 34,489 | 12/1993 | Hansma et al. | 250/560 |
| 4,343,993 | 8/1982 | Binnig et al. | 250/306 |
| 4,422,002 | 12/1983 | Binnig et al. | 310/328 |
| 4,520,570 | 6/1985 | Bednorz et al. | 33/180 |
| 4,668,865 | 5/1987 | Gimzewski et al. | 250/306 |
| 4,700,075 | 10/1987 | Kurz et al. | 250/368 |
| 4,724,318 | 2/1988 | Binnig | 250/306 |
| 4,785,177 | 11/1988 | Besocke | 250/442.1 |
| 4,800,274 | 1/1989 | Hansma et al. | 250/306 |
| 4,806,755 | 2/1989 | Duerig et al. | 250/306 |
| 4,823,004 | 4/1989 | Kaiser et al. | 250/306 |
| 4,837,435 | 6/1989 | Sakuhara et al. | 250/306 |
| 4,866,271 | 9/1989 | Ono et al. | 250/306 |
| 4,868,396 | 9/1989 | Lindsay | 250/440.1 |
| 4,871,938 | 10/1989 | Elings et al. | 310/328 |

(List continued on next page.)

OTHER PUBLICATIONS

Basett et al., "Scanned–Cantilever Atomic Force Miscroscope", Rev. Sci. Instrum., 64 (4), Apr. 1993, pp. 908–911.
Clark et al., "A High Performance Scanning Force Microscope Head Design", Rev. Sci. Instrum., 64 (4), Apr. 1993, pp. 904–907.
Meyer et al., "Optical–Beam–Deflection Atomic Force Microscopy: The NaCl (001) Surface", App. Phys. Lett., vol. 56, No. 21, 21 May 1990, pp. 2100–2101.
Van der Worf et al., "Compact Stand–Alone Atomic Force Microscope", Rev. Sci. Instrum., 64 (10), Oct. 1993, pp. 2892–2897.
P. K. Hansma and B. Drake, et al., J. Appl. Phys. 76 (2), 15 Jul. 1994, pp. 796–799.
P. S. Jung. "Novel Stationary–Sample Atomic Force Microscope with Beam–Tracking Lens", Dec. 14, 1992.

(List continued on next page.)

*Primary Examiner*—Hezron E. Williams
*Assistant Examiner*—Daniel S. Larkin
*Attorney, Agent, or Firm*—D'Alessandro & Ritchie

[57] ABSTRACT

A scanning probe microscope such as an atomic force microscope for measuring a feature of a sample surface with a sharp probe over an area of interest by means of a collimated light beam reflected from a reflective surface responsive to movement of the sharp probe relative to the sample surface, the movement detected by a position sensitive photodetector, includes a scanner having one end fixed and another end free and attached to the sharp probe for moving the sharp probe. Also fixed to the free end of the scanner is a mount for a beam tracking lens which is interposed into the collimated light beam to cause a focus spot of the light beam to track translational movement of the reflective surface caused by the scanner. In this way, a wide range of scanning ranges up to about 100×100 square micrometers is accommodated as is scanner head and scanner mode switching without the need to disturb the sample. Preferably the beam tracking lens is bi-convex and the source of the collimated light beam is a diode laser.

37 Claims, 3 Drawing Sheets

U.S. PATENT DOCUMENTS

| | | | |
|---|---|---|---|
| 4,877,957 | 10/1989 | Okada et al. | 250/306 |
| 4,889,988 | 12/1989 | Elings et al. | 250/306 |
| 4,902,892 | 2/1990 | Okayama et al. | 250/307 |
| 4,914,293 | 4/1990 | Hayashi et al. | 250/306 |
| 4,924,091 | 5/1990 | Hansma et al. | 250/306 |
| 4,924,104 | 5/1990 | Stengl et al. | 250/492.3 |
| 4,935,634 | 6/1990 | Hansma et al. | 250/560 |
| 4,947,042 | 8/1990 | Nishioka et al. | 250/306 |
| 4,952,857 | 8/1990 | West et al. | 318/561 |
| 4,954,704 | 9/1990 | Elings et al. | 250/307 |
| 4,956,817 | 9/1990 | West et al. | 365/189 |
| 4,962,480 | 10/1990 | Ooumi et al. | 365/151 |
| 4,968,390 | 11/1990 | Bard et al. | 204/15 |
| 4,968,914 | 11/1990 | West et al. | 310/328 |
| 4,969,978 | 11/1990 | Tomita et al. | 204/153.1 |
| 4,992,659 | 2/1991 | Abraham et al. | 250/306 |
| 4,992,728 | 2/1991 | McCord et al. | 324/158 |
| 4,999,494 | 3/1991 | Elings | 250/306 |
| 4,999,495 | 3/1991 | Miyata et al. | 250/306 |
| 5,003,815 | 4/1991 | Martin et al. | 73/105 |
| 5,009,111 | 4/1991 | West et al. | 73/862.6 |
| 5,013,913 | 5/1991 | Benner | 250/307 |
| 5,017,010 | 5/1991 | Mamin et al. | 356/345 |
| 5,018,865 | 5/1991 | Ferrell et al. | 356/376 |
| 5,022,743 | 6/1991 | Kino et al. | 350/507 |
| 5,025,658 | 6/1991 | Elings et al. | 73/105 |
| 5,034,903 | 7/1991 | Alfano et al. | 364/569 |
| 5,047,633 | 9/1991 | Finlan et al. | 250/306 |
| 5,051,646 | 9/1991 | Elings et al. | 310/317 |
| 5,066,858 | 11/1991 | Elings et al. | 250/307 |
| 5,067,805 | 11/1991 | Corle et al. | 359/235 |
| 5,077,473 | 12/1991 | Elings et al. | 250/306 |
| 5,081,390 | 1/1992 | Elings | 310/328 |
| 5,103,095 | 4/1992 | Elings et al. | 250/306 |
| 5,107,113 | 4/1992 | Robinson | 250/306 |
| 5,107,114 | 4/1992 | Nishioka et al. | 250/306 |
| 5,117,110 | 5/1992 | Yasutake | 250/306 |
| 5,120,959 | 6/1992 | Tomita | 250/306 |
| 5,141,319 | 8/1992 | Kajimura et al. | 356/358 |
| 5,142,145 | 8/1992 | Yasutake | 250/306 |
| 5,144,833 | 9/1992 | Amer et al. | 73/105 |
| 5,155,361 | 10/1992 | Lindsay | 250/307 |
| 5,155,715 | 10/1992 | Ueyema et al. | 369/44.11 |
| 5,157,251 | 10/1992 | Albrecht et al. | 250/216 |
| 5,166,516 | 11/1992 | Kajimura | 250/234 |
| 5,168,159 | 12/1992 | Yagi | 250/306 |
| 5,189,906 | 3/1993 | Elings et al. | 73/105 |
| 5,196,713 | 3/1993 | Marshall | 250/561 |
| 5,198,715 | 3/1993 | Elings et al. | 310/328 |
| 5,202,004 | 4/1993 | Kwak et al. | 204/153 |
| 5,204,531 | 4/1993 | Elings et al. | 250/306 |
| 5,206,702 | 4/1993 | Kato et al. | 356/358 |
| 5,210,410 | 5/1993 | Barrett | 250/234 |
| 5,224,376 | 7/1993 | Elings et al. | 73/105 |
| 5,229,606 | 7/1993 | Elings et al. | 250/306 |
| 5,231,286 | 7/1993 | Kajimura et al. | 250/234 |
| 5,237,859 | 8/1993 | Elings et al. | 73/105 |
| 5,245,863 | 9/1993 | Kajimura et al. | 73/105 |
| 5,247,186 | 9/1993 | Toda | 250/561 |
| 5,253,516 | 10/1993 | Elings et al. | 73/105 |
| 5,257,024 | 10/1993 | West | 341/16 |
| 5,258,107 | 11/1993 | Yoshida et al. | 204/129.5 |
| 5,260,567 | 11/1993 | Kuroda et al. | 250/227.1 |
| 5,260,622 | 11/1993 | West | 310/328 |
| 5,260,824 | 11/1993 | Okada et al. | 359/368 |
| 5,262,643 | 11/1993 | Hammond et al. | 250/306 |
| 5,266,801 | 11/1993 | Elings et al. | 250/306 |
| 5,266,896 | 11/1993 | Rugar et al. | 324/307 |
| 5,266,897 | 11/1993 | Watanuki et al. | 324/244 |
| 5,267,471 | 12/1993 | Abraham et al. | 73/105 |
| 5,274,230 | 12/1993 | Kajimura et al. | 250/234 |
| 5,276,324 | 1/1994 | Ohtaki et al. | 250/306 |
| 5,280,341 | 1/1994 | Nonnenmacher et al. | 356/358 |
| 5,283,437 | 2/1994 | Greschner et al. | 250/306 |
| 5,283,442 | 2/1994 | Martin et al. | 250/561 |
| 5,286,977 | 2/1994 | Yokoyama et al. | 250/442.1 |
| 5,289,004 | 2/1994 | Okada et al. | 250/306 |
| 5,291,775 | 3/1994 | Gamble et al. | 73/105 |
| 5,293,042 | 3/1994 | Miyamoto | 250/306 |
| 5,294,804 | 3/1994 | Kajimura | 250/561 |
| 5,296,704 | 3/1994 | Mishima et al. | 250/306 |
| 5,298,975 | 3/1994 | Khoury et al. | 356/375 |
| 5,304,924 | 4/1994 | Yamano et al. | 324/158 R |
| 5,306,919 | 4/1994 | Elings et al. | 250/442.1 |
| 5,307,693 | 5/1994 | Griffith et al. | 73/862.6 |
| 5,308,974 | 5/1994 | Elings et al. | 250/234 |
| 5,314,254 | 5/1994 | Yashar et al. | 384/49 |
| 5,314,829 | 5/1994 | Coles | 436/165 |
| 5,317,153 | 5/1994 | Matsushiro et al. | 250/306 |
| 5,319,960 | 6/1994 | Gamble et al. | 73/105 |
| 5,321,977 | 6/1994 | Clabes et al. | 73/105 |
| 5,323,003 | 6/1994 | Shido et al. | 250/306 |
| 5,324,935 | 6/1994 | Yasutake | 250/234 |
| 5,325,010 | 6/1994 | Besocke et al. | 310/317 |
| 5,357,105 | 10/1994 | Harp et al. | 250/234 |
| 5,388,452 | 2/1995 | Harp et al. | 73/105 |
| 5,406,832 | 4/1995 | Gamble et al. | 73/105 |
| 5,406,833 | 4/1995 | Yamamoto | 73/105 |
| 5,408,094 | 4/1995 | Kajimura | 250/306 |

OTHER PUBLICATIONS

Stephen A. Joyce, "Mechanical Relaxtion of Organic Monolayer Films Measured by Force Microscopy", Physical Review Letters, vol. 68(18), pp. 2790–2793, May 4, 1992.

G. Binnig, "Single–Tube Three–Dimensional Scanner for Scanning Tunneling Microscopy", Rev. Sci. Instrum. 57 (8), pp. 1688–1689, Aug. 1986.

B. Drake, "Imaging Crystals, Polymers, and Processes in Water with the Atomic Force Microcope", Science, vol. 243, pp. 1586–1589, Mar. 24, 1989.

Richard Sonnenfield, "Atomic–Resolution Microscopy in Water", Science, vol. 232, pp. 211–213, Apr. 11, 1986.

P. Davidson, "A New Symmetric Scanning Tunneling Microscope Design", Journal of Vacuum Science & Technology: Part A, pp. 380–382, Mar./Apr. 1986.

O. Marti, "Atomic Force Microscopy of Liquid–covered Surfaces: Atomic Resolution Images", Appl. Phys. Lett. 51(7), pp. 484–486, Aug. 17, 1987.

M. D. Kirk, "Low Temperature Atomic Force Microscopy", Rev. Sci. Instrum. 59(6), pp. 833–835, Jun. 1988.

Richard Sonnenfeld, "Semiconductor Topography in Aqueous Environments: Tunneling Microscopy of Chemomechanically Polished (001) GaAs", 320 Applied Physics Letters 50(24), pp. 1742–1744, Jun. 15, 1987.

S. A. Chalmers, "Determination of Tilted Superlattice Structure by Atomic force Microscopy", 320 Applied Physics Letters 55(24), pp. 2491–2493, Dec. 11, 1989.

O. Marti, "Control Electronics for Atomic Force Microcopy", Rev. Sci. Instrum., vol. 59(6) pp. 836–839, Jun. 1988.

Exhibit C, p. 691, copyright 1986.

Exhibit B, Paul West, "Chemical Applications of Scanning Tunneling Microscopy", IBM J. Res. Develop. vol. 30(5), pp. 484–490, Sep. 1986.

Exhibit A, John Adam Kramer, Candidacy Report, pp. 1–48, May 21, 1985.

C. Mathew Mate, "Research Report—Determination of Lubricant Film Thickness on A Particulate Disk Surface by Atomic Force Microscopy", Apr. 25, 1989.

Y. Martin, "Atomic Force Microscope—Force Mapping and Profiling on a sub 100–A Scale", J. Appl. Phys. 61(10), May 15, 1987.

H. Hanselmann, "Implementation of Digital Controllers–A Survey", Automatica, vol. 23(1) pp. 7–32, 1987.

B. B. Damaskin, "Comprehensive Treatise of Electrochemistry vol. 1: Chapter 8: The Absorption of Organic Molecules", pp. 353–395.

G. Travaglini, "Scanning Tunneling Microscopy on Biological Matter", Surface Science 181, pp. 380–390, 1987.

F. Ohnesorge, "True Atomic Resolution by Atomic Force Microscopy Through Repulsive and Attractive Forces", Science vol. 260, pp. 1451–1456, Jun. 4, 1993.

Allan J. Melmed, "Art and Science and other Aspects of Making Sharp Tips", J. Vac. Sci. Technol. B 9(2), pp. 601–608, Mar./Apr. 1991.

Inga Holl Musselman, "Platinum/Iridium Tips with Controlled Geometry Tunneling Microscopy", J. Vac. Sci. Technol. A, vol. 8(4), pp. 3558–3562 Jul./Aug. 1990.

J. P. Ibe, "On the Electrochemical Etching of Tips for Scanning Tunneling Microscopy", J. Vac. Sci. Technol. A, vol. 8(4), pp. 3570–3575, Jul./Aug. 1990.

L. A. Nagahara, "Preparation and Characterization of STM Tips for Electrochemical Studies".

Martin Specht, "Simultaneous Measurement of Tunneling Current and Force as a Function of Position Through A Lipid Film on A Solid Substrate", Surface Science Letters 257, pp. L653–658, 1991.

M. Brede, "Brittle Crack Propagation in Silicon Single Crystals", J. Appl. Phys. 70(2), pp. 758–771, Jul. 15, 1991.

S. M. Hu, "Stress–Related Problems in Silicon Technology", J. Appl. Phys. 70(6), pp. R53–R80, Sep. 15, 1991.

ATOMIC FORCE MICROSCOPE EMPLOYING BEAM TRACKING

CROSS-REFERENCE TO RELATED APPLICATION

This application is a continuation of U.S. patent application Ser. No. 08/190,948 filed Feb. 3, 1994, now U.S. Pat. No. 5,440,920.

BACKGROUND OF THE INVENTION

1. Field of the Invention

The present invention relates generally to the field of scanning probe microscopy and more particularly to a novel scanning force or atomic force microscope having a stationary sample stage and a beam tracking lens which may utilize an S-shaped piezoceramic scanner to provide relative motion between the probe tip of the atomic force microscope and the surface of the sample being scanned.

2. The Prior Art

The atomic force microscope ("AFM") belongs to a family of devices known as scanning probe microscopes ("SPMs"). These devices all use a probe with a sharp tip to scan a surface and measure the surface features such as topography as a function of probe-surface interaction at the location of the probe, generally yielding a two-dimensional array of data. SPMs comprise a number of different systems for measuring various types of probe-surface interactions. The first device of this family was the Scanning Tunneling Microscope ("STM") which is described in U.S. Pat. No. 4,724,318 to Binnig et al. The second device of the family is the AFM which this invention is directed to. Since the invention of the STM and the AFM, scanning probe microscopy has found applications in many areas of science and engineering due to its simplicity and high resolution at atomic dimensions.

AFMs typically employ a fine flexible cantilever with a small spring constant (in the range of $10^{-1}$ to $10^{-3}$N/m) and a sharp probe tip disposed at the free end of the cantilever. The bending of the cantilever in an AFM is related to the atomic force exerted on the tip (in the range of $10^{-8}$ to $10^{-13}$N) by the local topography of the sample surface. For measurement of the force, the optical beam deflection method, also known as the optical lever method (or "OLM") is frequently used. Pursuant to the OLM, a laser such as a diode laser is positioned so that its laser beam intersects the reflective side or back of the cantilever which is away from the surface of the sample being scanned ("sample surface"). The angle of reflection of the laser beam reflected off of the reflective back of the cantilever is sensed at a distance by a position sensitive photodetector device such as a bi-cell photodetector. The measured angle of reflection of the laser beam from the cantilever is thus related to the topography of the sample surface. Most AFM systems are designed to move the sample surface relative to a stationary probe tip (see, e.g., Binnig et al., *Phys. Rev. Lett.*, 1982, 49, pp. 57–60; *Phys. Rev. Lett.*, 1986, 56, pp. 930–933; Jahnamir et al., *Scanning Microscopy*, 1992, 6, pp. 625–660) in order to maintain the probe's optical alignment with respect to a stationary laser emitter. Thus, the sample is mounted at the end of a voltage controlled scanner made of a piezoceramic tube (also known as a "PZT"). The characteristics of the PZT and the range of the applied voltages determine the size of the scanned area as well as the resolution of the image of the sample surface. By using various different scanners having different PZTs, areas as small as several square nanometers, or as large as tens of thousands of square micrometers, can be characterized by the AFM.

In AFMs according to most of the prior art, the sample must be attached to the scanner. Such prior art AFMs operate with a stationary probe and moving sample as described above. The sample can be disturbed during operation of such prior art AFMs because the sample must be moved in order to scan an area of the sample surface. According to such prior art, it is also necessary to disturb the sample every time that the scanning range or scanning method (e.g., probe) is changed, because to accomplish such changes, disassembly and reassembly of all or part of the AFM system is required. This process often requires detaching the sample from its mount, adjusting the AFM, and then remounting the sample. Such requirements restrict the size and weight Of the sample to be scanned. Prior art AFMs also often require that the detecting optics (e.g., the bi-cell photodetector) be moved during the scanning process. (See, e.g., Jahnamir et al., Supra). All of these changes and movements required by the prior art devices can affect both the sample and the measurement of its surface properties, limit the quality of the data obtained, and make different measurements of the same sample difficult or inconsistent. Disturbing the sample when changing scanners or scanning modes (e.g., STM, AFM), besides being time consuming, may interfere with the measurement(s) being made. This is usually true when working with adsorbates, or when working in situ in a liquid cell. Imaging under solution in a liquid cell can be performed both with and without electrochemical control. The significance and the application of working under electrochemical control is described and patented by S. Lindsay in U.S. Pat. No. 5,155,361. When working under electrochemical control, disconnecting the sample from the applied voltages for changing scanners or scanning modes can cause severe and irreversible changes to the sample surface.

SUMMARY OF THE INVENTION

According to the present invention the sample need not be disturbed in order to change either the scanners (scanning heads) or the scanning modes. Rather, it is the scanner with beam tracking lens that moves instead of the sample when various areas of the sample surface are to be scanned. Preferably the present invention may comprise one microscope with several interchangeable scanning heads. Tracking and focusing of the laser beam eliminate most errors due to beam deflection and enables AFM imaging of large areas (in the micrometer range) without losing resolution. Preferably the present invention may enable solution/electrochemical imaging of a surface or surfaces emersed in a liquid without moving the sample and disturbing the equilibrium of the sample in solution and may preferably include a stationary sample stage, a beam tracking lens and an S-shaped scanner.

OBJECTS AND ADVANTAGES OF THE INVENTION

Accordingly, it is an object of the present invention to provide a stationary stage atomic force microscope and method of operating same with the ability to map out the topography of a stationary sample substrate in the nanometer to micrometer range using an optical lever method deflection detection system with an S-shaped scanner while allowing for the easy changing of scanning modes and scanning heads without disturbing the sample.

Another object of the present invention is to provide new and improved means and method for carrying out scanning probe microscopy in which the moving probe is implemented using a simple beam tracking lens to guide the laser beam automatically with the moving probe in air or in solution where the sample is stationary and scanner heads and scanning modes can be changed without removing the sample or disassembly or reassembly of the microscope.

It is another object of the present invention to provide a unique stationary sample stage Scanning Probe Microscope with beam tracking lens using an optical lever method with a stationary sample and several interchangeable scanning heads to analyze samples with several scanning modes (including but not limited to: Scanning Tunneling and Atomic Force microscopies) and a wide range of scanning areas (from a few square nanometers to thousands of micrometers square) without requiring the removal of the sample and/or the disassembly and reassembly of the microscope and/or, in a liquid cell, the disassembly and reassembly of the liquid cell.

It is another object of the present invention to improve upon existing means of making AFM measurements.

Yet another object of the present invention is to provide a significant improvement over past SPM technology by providing for high, medium and low resolution imaging of surfaces in both air and solution without disturbing the test sample surface.

Another object of the present invention is to provide a novel design of a device embodying optical lever methodology for atomic force microscopy where the sample is stationary and the cantilever is moved during scanning. More particularly, it is an object of the present invention to provide a stable microscope which allows scanners to be changed without either removing the sample or disassembling and reassembling the microscope.

Another object of the present invention is to provide an atomic force microscope having an increased scanning range which is not limited by the size of the reflective surface on the back of the cantilever.

Another object of the present invention is to provide improved means and method for carrying out atomic force microscopy which achieve improved image quality for all scanning areas including large areas previously believed unattainable in prior devices having no beam tracking lens.

Yet another object of the present invention is to provide a novel and unique atomic force microscope which is capable of suffering substantially no errors as a result of beam deflection.

A further object of the present invention is to provide a novel and unique atomic force microscope having as S-shaped scanner which adjusts for tilt and thereby provides enhanced images at both low and high resolution.

These and many other objects and advantages of the present invention will become apparent to those of ordinary skill in the art from a consideration of the drawings and ensuing description of the invention.

DESCRIPTION OF THE PREFERRED EMBODIMENTS

Those of ordinary skill in the art will realize that the following description of the present invention is illustrative only and is not intended to be in any way limiting. Other embodiments of the invention will readily suggest themselves to such skilled persons from an examination of the within disclosure.

Figure 2:
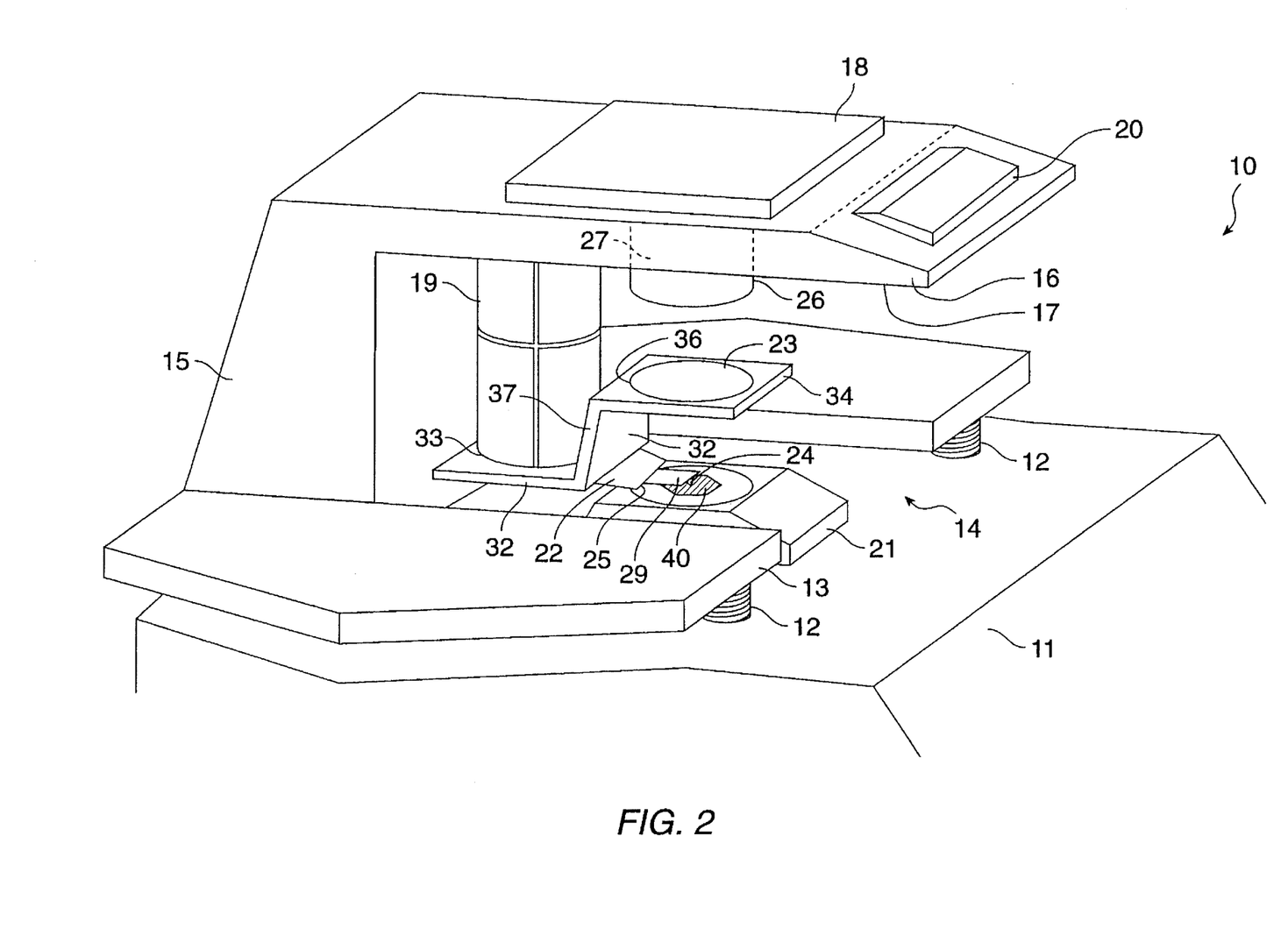
FIG. 2 is an isometric view of the atomic force microscope of FIG. 1.

The atomic force microscope of the present invention is identified by the reference numeral 10 in FIG. 2. Microscope 10 comprises a base member 11 having a plurality of leveling screws 12 depending therefrom and supporting a flat pedestal 13 thereupon. Pedestal 13 has a U-shaped opening 14 defined in the middle thereof. Microscope 10 further comprises a vertical support member 15 with which a horizontal support mount 16 is integrally formed to extend outwardly therefrom. A laser adjustment attachment 18, a PZT tube scanner 19, and the detector position adjustment attachment 20 are mounted on support mount 16 as hereinafter described in detail. U-shaped opening 14 provides space in which to position sample stage 21 in operative relationship to PZT tube scanner 19. Base member 11 preferably functions as a motorized translation stage to enable the height and the tilt of pedestal 13 to be adjusted as needed.

One end of the PZT tube scanner 19 is attached to the bottom surface 17 of support mount 16. The other end of PZT tube scanner 19 is connected with cantilever holder 22 and beam tracking lens 23. A cantilever probe 24 is secured to the free end 25 of cantilever holder 22.

A laser module 26 such as a diode laser element is attached to laser adjustment attachment 18 as shown in FIG. 2 which, as described, is attached to support mount 16. Support mount 16 has an opening 27 defined therethrough to allow the shank of laser module 26 to extend downwardly therethrough towards the cantilever probe 24. Laser module 26, thus positioned, produces a coherent, collimated laser light beam directed downwardly through beam tracking lens 23 toward the upper surface of cantilever probe 24.

Detector position adjustment attachment 20 comprises position sensitive photodetector module 28 and is likewise attached to support mount 16 adjacent to laser module 26. A clearance opening (not shown) is defined through support mount 16 to enable the photodetector embodied in position sensitive photodetector module 28 to receive laser light reflected from cantilever probe 24.

An L-shaped support member 32 is attached to the lower surface 33 of PZT tube scanner 19 and extends outwardly and upwardly therefrom. Lens support arm 34 is integrally formed with L-shaped member 32 and extends outwardly therefrom. Beam tracking lens 23 is seated within lens seating opening 36 formed in lens support arm 34 and secured thereto. The vertical arm 37 of L-shaped member 32 will be the same length as the focal length of beam tracking lens 23.

Cantilever holder 22 is formed preferably of flat steel and is attached to the bottom portion of L-shaped member 32 and extends outwardly therefrom. The distal end 38 of cantilever holder 22 carries cantilever probe 24 which is positioned directly under beam tracking lens 23.

Sample stage 21 is separate from pedestal 13 and the assembly of microscope 10 which is positioned on the top of motorized translational stage or base 11. Sample stage 21 normally will be formed of a block of stainless steel having a thickness sufficient to allow a sample 40, which is located on top of sample stage 21 to be engaged by cantilever probe 24 within the mechanical travel distance of base 11 in response to leveling screws 12 which are preferably motor driven.

As previously described, base 11 has three levelling screws 12 extending from the bottom which, in a preferred practice of this invention are controlled, individually, by three motors, or three thumb screws (not shown). The amount of available extension of the screws 12 governs the distance between the cantilever probe 24 and surface of sample 40.

Figure 1:
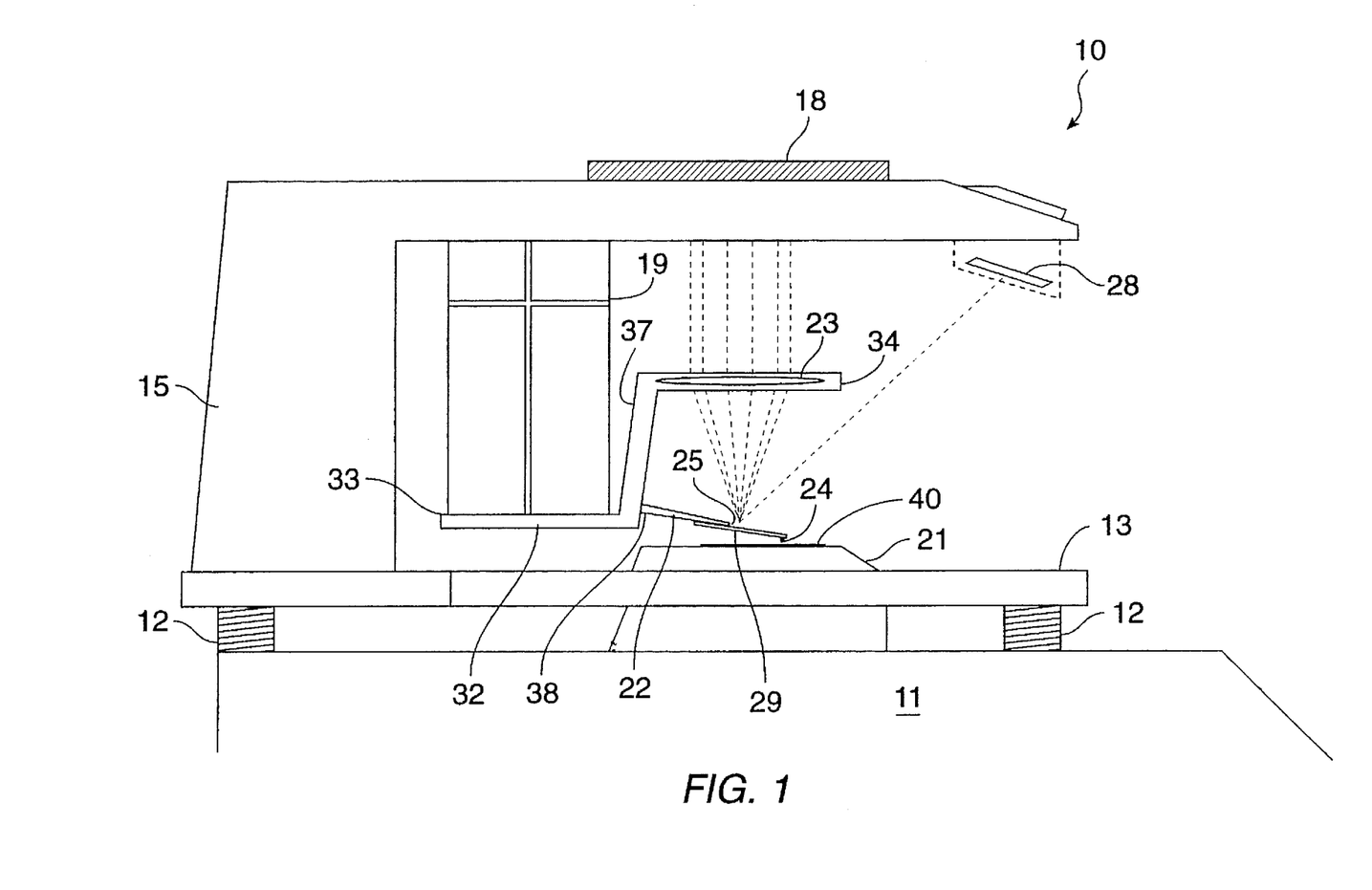
FIG. 1 is a schematic diagram of an atomic force microscope according to the present invention.

As particularly shown in FIGS. 1 and 2, microscope 10 comprises a sample stage 21 supporting sample 40 and the cantilever probe 24. A collimated diode laser module 26 is mounted so as to remain stationary with respect to microscope 10 during operation of microscope 10. The cantilever probe or tip 24 is attached to PZT tube scanner 19 directly and in fixed relationship to beam tracking lens 23 as shown.

A beam tracking lens 23 is attached, as described above, to L-shaped member 32. Beam tracking lens 23 can be a commercial grade bi-convex lens (diameter 10 mm) of focal length 25 mm. Cantilever holder 22, including beam tracking lens 23, is so designed to be as light as possible (less than 20 g) and mechanically rigid.

The moving beam tracking lens (moving with the movement of the lower surface 33 of PZT tube scanner 19) acts as a guide to the stationary laser beam to follow the moving cantilever. Such tracking action is achieved based upon the geometric optical principal, that all rays passing through the beam tracking lens 23 go to one focal point, regardless of the positions of incidence at the lens aperture as shown in FIG. 1. If the upper reflective surface of cantilever probe 24 moves slightly out of the initial optic axis, the beam tracking lens 23 moves out of the axis the same amount, leaving the laser beam arriving at the outer portions of the lens, where the curvature of the lens makes the beam bend toward the axis, The degree of the bend is such that the beam is still focused at the focal point, which is fixed at the reflective back surface of the cantilever, thus the automatic tracking action is achieved without any complicated active-control elements.

The position sensitive photodetector module 28 mounted within detector position adjustment attachment 20 produces electrical signals indicating the change of the position of the light beam which is reflected from the reflective back of the moving cantilever 29. At the end of the moving cantilever 29 there is a sharp-pointed probe tip 24 to inspect the surfaces and topologies of the sample 40. The electrical signal from the position detector is the measure of the amount of the force of atomic interaction between the probe tip 24 the surface of sample 40. This is the result of the force causing the probe tip 24 to be pushed or pulled higher or lower thus producing a bend in the cantilever 29. Such bending makes the laser light beam, focused by the moving beam tracking lens 23, change its angle of deflection, which causes the reflected light beam to emerge in the direction of position sensitive photodetector module 28 with force-varying angles.

The motion of cantilever probe 24 also causes the absolute position of the focus to move. However, due to the intrinsic optical property, within the practical limit, such position changes do not contribute significantly to the direction of the reflected laser light beam. Therefore, only the reflection angle of the beam, which is proportional to the magnitude of the force acting on the cantilever probe 24, is the cause of the change of the position of the bright spot (due to the reflected laser light beam) on the position sensitive photodetector module 28.

Images are recorded from microscope 10 using existing art equipment such as the Model TAC 3.0 available from AT Corp. of Tempe, Ariz. During imaging, the beam tracking lens 23 focuses all of the parallel incident light rays from laser module 26 into a fixed focused position below the cantilever probe 24. During operation, PZT tube scanner 19, beam tracking lens 23, cantilever probe 24 and cantilever holder 22 are moved so that the cantilever probe 24 is translated across the desired area of the surface of sample 40 which remains stationary on sample stage 21. The laser beam detection with the optical lever method is performed by using beam tracking lens 23 to guide the laser beam automatically with the moving cantilever probe 24.

Although the laser, the bi-cell photodetector, and cantilever are virtually the same as described in the optical lever scheme, the present invention provides three noteworthy advantages compared to the conventional optical lever scheme. First, the cantilever probe is attached directly to the PZT tube scanner by the cantilever holder. Second, a beam tracking lens is attached to the moving probe holder and to the bottom of the PZT tube scanner. Third, an S-shaped PZT tube scanner is provided.

Unevenness with an AFM image is caused by three factors. First, the "mirror" (reflective back of cantilever 29) moves out of the laser beam spot, as anticipated. Thus, the maximum range of scanning, $R_0$, may be expressed as:

$$R_0 = (w^2 + D^2)^{1/2}$$

where w is the diameter of the laser spot, and D is the diameter of effective mirror area. When D and w are both equal to 20 µm, then $R_0 = 28$ µm. Second, a constant background slope of average 5% is observed even after the relative sample tilt is adjusted to its minimum. It is interpreted that the finite size of the cantilever mirror selectively reflects part of the beam wave front. The wave front is found to be already highly spherical, even at a small distance (larger than −100 µm) from the beam waist. In a typical experiment, the focal point is located 2 mm above the cantilever to allow the largest scanning area. Using Gaussian optics, this deviation is calculated. The results predict the background to have 3% slope, in agreement with the observed 5%. Third, the uneven field near the boundaries of the image in respect to the detector orientation. Such a deflection can exist when there is diffraction of the beam by the non-perpendicular edges, especially of triangular tube cantilevers. Other causes, such as non-linear PZT response, are not significant in the images discussed here.

These factors are corrected by adding the beam tracking lens. In a geometric optic regime, the simple lens focuses all of the parallel incident rays into a fixed focus position. The lens eliminates most errors. The percent error in this case can be obtained as follows. Consider that the lens moves out of the optical axis slightly, as the scanner moves; then, the beam is no longer parallel to the axis because it is directed to the cantilever. This changes the incident angle which, in turn, may result in a beam shift at the detector position. Therefore, if the maximum scanning area is $P^2$, and the focal length of the lens is F, then the change of the reflection angle θ is given by θ=2P/F. In terms of height error Z, using the optical lever formula described by Saridin in "Scanning Force Microscopy" (Oxford U. Press) 1991, p. 120, θ=3Z/2L. Therefore, the percent error τ is given by τ=Z/P=4L/3F, where L is the length of the cantilever. When L=100 μm and F=25 mm, then τ=0.50%. Compared to the previous lensless case, the error is reduced by an order of magnitude. Within the Gaussian optics frame, which covers the experimental conditions here, the error is linear in P. Based on these, the maximum scanning range using a moving probe can be larger than 100×100 μm².

In order to move the cantilever, it is attached at the end of the scanning piezoceramic tube, which is controlled by the high voltages applied to the electrodes located at the side walls of the tube. When the PZT is bent by these voltages, it is accompanied by a tilt of the bottom surface as described by Carr, R. G. "Finite element analysis of PZT tube scanner motion for scanning tunneling microscopy", *Journal of Microscopy*, 152, pp. 379–385, 1988. This results in a large change in the probe height during scanning. The tilt is removed to less than experimental tolerances by using the special S-shaped scanner of this invention. Experiments demonstrate that this design and method yields excellent images in AFM. See Jung and Yaniv, *Electronics Letters*, 29, No. 3, pp. 264–265.

In the prior art, which makes the PZT tube bend in an L-shape, one of the electrodes is controlled by a scanning voltage, say, in the X direction (Vx+), and the opposite electrode is controlled by another voltage (Vx−) in the X direction. The tube bends by an amount proportional to the difference in the two high voltages in the X direction. In the orthogonal direction (Y), each of the two electrodes facing each other has another controlling voltage in the Y direction in a similar fashion. One is Vy+ and the other is Vy−. Therefore, the tube will bend in the Y direction in response to the difference between Vy+ and Vy−. In addition, the inner surface of the tubes is covered with a separate cylindrical metallic electrode. A separate voltage to control the amount of the extension of the tube is applied to that electrode (Vz). The amount of the voltage difference between the Vz and the average values of the Vx+, Vx−, Vy+ and Vy− determines the amount of the extension, which is used to adjust the height.

Figure 3:
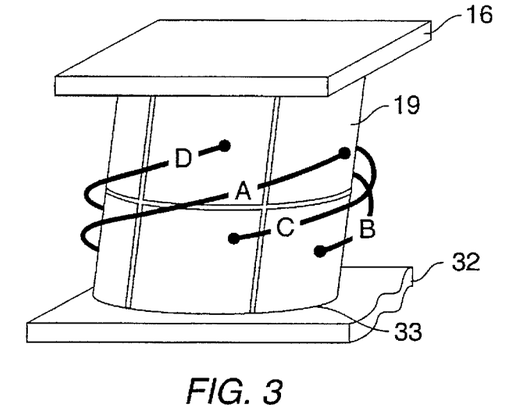
FIG. 3 is a front view of an S-shaped scanner according to the present invention showing the application of scanning voltages thereto.
Figure 4:
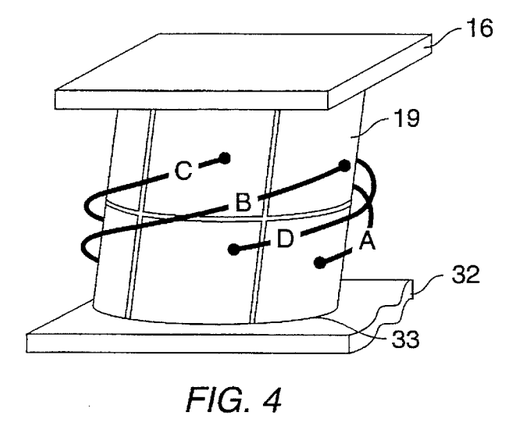
FIG. 4 is a rear view of the S-shaped scanner of FIG. 3.
Figure 5:
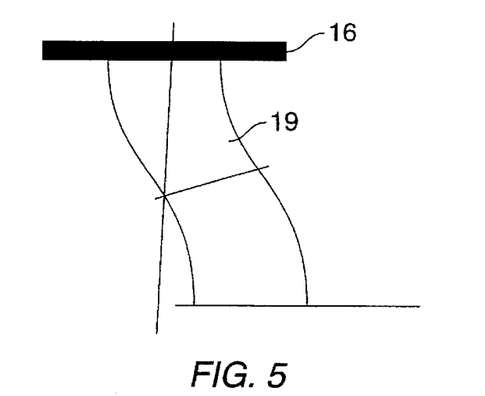
FIG. 5 is a schematic diagram of an S-shaped scanner according to the present invention.

The S-shaped scanner 19, as shown in FIGS. 3, 4 and 5, is composed of two identical PZT scanners implemented one on the top of the other. Both parts have four independent electrodes around the side walls of the tube, thus the total number of independent electrodes in the S-shaped scanner of the current invention is eight. Each electrode occupies one quadrant and tracks on the side wall outer surface as shown in FIGS. 3 and 4 where "A" represents applied voltage Vx+, "B" represents Vx− voltage, "C" represents Vy− voltage, and "D" represents Vy+ applied voltage.

In the current invention, two of the tubes with the same electrode configuration as the prior art are used. The improvement is to make one body scanner by placing one on top of the other. This is achieved either by gluing two separately made PZT tubes together or separating the four quadrant electrodes by half, at the midway along the length of the scanner tube, thus realizing eight different electrodes. Then the top and bottom half electrodes are connected to the opposite polarities of the control voltages, such that if one of the top electrodes has Vx+, the bottom electrode at the same side has Vx− connected, and vice versa. At the orthogonal direction, Vy+ is at the top, the Vy− is at the bottom, and vice versa. Therefore, although four additional electrodes are added, the number of necessary control voltages are the same, including the Vz which is connected at the inside electrode, to control the height as shown in FIG. 3.

When the top section of the S-shaped scanner bends to one side, the tilt is created at the end of the section, which is the exact mid-point of the tube. At the same time, the bottom part bends to the opposite direction, with exactly the same amount of the tilt but, in the opposite direction, because the relative polarities of the voltages are opposite. Therefore, the net tilt at the bottom of the overall tube is virtually eliminated, as long as the sections are of the identical property.

In fact, the two sections bend to the opposite directions. However, the direction of the tilt of the top part is to the same direction of the bend, which makes the bottom part displaced to the same direction as the bending. The bottom part is bending toward the opposite direction. The top surface of the tube is a fixed flat surface, and the bottom part bends from the tilt angle caused by the top section of the PZT tube toward the direction of the displacement. The bending of the bottom part always leaves the overall net displacement to the direction of the bending of the top part. This result is obtained because the direction of the tilt is the same as the direction of the bending; the amount of the tilt is proportional to the amount of the bending; and the two sections are exactly identical to each other.

Therefore, the tilt angles are eliminated, while achieving the net scanning motion of the PZT tube. When the bending occurs, the overall shape looks like as alphabet "S". The extension action in the Z-direction is not affected by such electrode configuration. FIG. 5 shows the S-shaped bending of the present invention.

Mathematically, two same sections of arcs taken from one circle connected tangentially at the one end to the opposite direction will always yield a net displacement between the two end points, so long as the arcs are less than one-half of the circle.

The displacement of the prior art L-shaped bending is given by:

$$d_L = \tfrac{1}{2}(L/R)^2$$

where R is the radius of the arc and L is the length of the overall tube, if R>>L. The S-shape yields:

$$d_s = 2 * \tfrac{1}{2}(L/R)^2 = \tfrac{1}{4}(L/R)^2$$

Therefore, the displacement is reduced by ½, which is compensated for by increasing the length of the PZT tube by 1.4 times.

While illustrative embodiments and applications of this invention have been shown and described, it would be apparent to those skilled in the art that many more modifications than have been mentioned above are possible without departing from the inventive concepts set forth herein. The invention, therefore, is not to be limited except in the spirit of the appended claims.

What is claimed is:

1. A scanning force microscope for examining surface properties of a sample surface, said microscope comprising:

a frame;

a sample stage;

a scanner element having a scanner end capable of motion relative to said frame in response to signals applied to said scanner element;

a cantilever having a reflective back surface, a first cantilever end and a second cantilever end, said first cantilever end having a sharp probe tip extending therefrom toward said sample stage, said second cantilever end coupled to said scanner;

at least one beam tracking element held in a fixed relationship to a portion of said scanner element;

a source of a collimated light beam, said source arranged to project said collimated light beam to said at least one beam tracking element and from said at least one beam tracking element to said reflective back surface of said cantilever forming a reflected light beam emanating from said reflective back surface; and a position sensitive detector positioned to intercept said reflected light beam and produce a signal responsive to angular movement of said reflected light beam.

2. A scanning force microscope according to claim 1 wherein said position sensitive detector comprises a multi-cell photodetector.

3. A scanning force microscope according to claim 2 wherein said multi-cell photodetector is a bi-cell photodetector.

4. A scanning force microscope according to claim 1 wherein said scanner element is a piezoceramic scanner.

5. A scanning force microscope according to claim 4 wherein said piezoceramic scanner is a tube.

6. A scanning force microscope according to claim 5 wherein said tube is an S-shaped scanner.

7. A scanning force microscope according to claim 1 wherein said at least one beam tracking element comprises at least one lens.

8. A scanning force microscope according to claim 7 wherein said at least one lens is bi-convex.

9. A scanning atomic force microscope according to claim 1 wherein said source includes a laser.

10. A scanning force microscope according to claim 9 wherein said laser is a diode laser.

11. A scanning force microscope according to claim 10 wherein said source further includes means for adjusting the position of said source with respect to said frame.

12. A scanning force microscope according to claim 1 wherein said position sensitive detector further includes means for adjusting the position of said position sensitive detector with respect to said frame.

13. An atomic force microscope for examining the surface properties of a sample surface, said atomic force microscope comprising:

a frame;

a sample stage;

a piezoceramic tube scanner element having a scanner end capable of motion relative to said frame in response to signals applied to said scanner element;

a cantilever having a reflective back surface, a first cantilever end and a second cantilever end, said first cantilever end having a sharp probe tip extending therefrom toward said sample stage;

at least one beam tracking lens fixed in operation to a portion of said scanner element;

a source of a collimated light beam including a diode laser module, said source fixed in operation to said frame, said source arranged to project said collimated light beam through said at least one beam tracking lens and to said reflective back surface of said cantilever forming a reflected light beam emanating from said reflective back surface; and a position sensitive photodetector fixed in operation to said frame and positioned to intercept said reflected light beam and produce a signal responsive to angular movement of said reflected light beam.

14. An atomic force microscope according to claim 13 wherein said postion sensitive photodetector further includes means for adjusting the position of said position sensitive detector with respect to said frame.

15. An atomic force microscope according to claim 13 wherein said source further includes means for adjusting the position of said source with respect to said frame.

16. An atomic force microscope for examining the surface properties of a sample surface, said atomic force microscope comprising:

a frame;

a sample stage disposed under a portion of said frame;

a piezoceramic tube scanner element having a scanner end capable of motion relative to said frame in response to signals applied to said scanner element;

a cantilever having a reflective back surface, a first cantilever end and a second cantilever end, said first cantilever end having a sharp probe tip extending therefrom toward said sample stage;

a source of a collimated light beam, said source fixed in operation to said frame, said source arranged to project said collimated light beam to said reflective back surface of said cantilever forming a reflected light beam emanating from said reflective back surface; and a position sensitive photodetector fixed in operation to said frame and positioned to intercept said reflected light beam and produce a signal responsive to angular movement of said reflected light beam.

17. A scanning probe microscope for examining the surface properties of a sample surface, said scanning probe microscope comprising:

a frame;

a sample stage having an upper surface for supporting a sample, said sample stage disposed under a portion of said frame wherein said upper surface of said sample stage is not in contact with said frame;

a piezoceramic tube scanner element having a scanner end capable of motion relative to said frame in response to signals applied to said scanner element;

and a scanning probe for interacting with the sample surface disposed on said sample stage, said scanning probe suspended from said tube scanner.

18. A scanning force microscope for examining surface properties of a sample surface, said microscope comprising:

a frame;

a sample stage;

a scanner element having a scanner end capable of motion relative to said frame in response to signals applied to said scanner element;

a cantilever having a reflective back surface, a first cantilever end and a second cantilever end, said first cantilever end having a sharp probe tip extending therefrom toward said sample stage, said second cantilever end coupled to said scanner;

at least one beam tracking element held in a fixed relationship to a portion of said scanner element;

a source of a beam of radiant energy, said source arranged to project said beam of radiant energy to said at least one beam tracking element and from said at least one beam tracking element to said reflective back surface of said cantilever forming a reflected beam of radiant energy emanating from said reflective back surface; and a position sensitive detector positioned to intercept said reflected beam of radiant energy and produce a signal responsive to angular movement of said reflected beam of radiant energy.

19. A scanning force microscope according to claim 18 wherein said position sensitive detector comprises a multi-cell photodetector.

20. A scanning force microscope according to claim 19 wherein said multi-cell photodetector is a bi-cell photodetector.

21. A scanning force microscope according to claim 18 wherein said scanner element is a piezoceramic scanner.

22. A scanning force microscope according to claim 21 wherein said piezoceramic scanner is a tube.

23. A scanning force microscope according to claim 22 wherein said tube is an S-shaped scanner.

24. A scanning force microscope according to claim 18 wherein said at least one beam tracking element comprises at least one lens.

25. A scanning force microscope according to claim 24 wherein said at least one lens is bi-convex.

26. A scanning atomic force microscope according to claim 18 wherein said source includes a laser.

27. A scanning force microscope according to claim 26 wherein said laser is a diode laser.

28. A scanning force microscope according to claim 27 wherein said source further includes means for adjusting the position of said source with respect to said frame.

29. A scanning force microscope according to claim 18 wherein said position sensitive detector further includes means for adjusting the position of said position sensitive detector with respect to said frame.

30. An atomic force microscope for examining the surface properties of a sample surface, said atomic force microscope comprising:
   a frame;
   a sample stage;
   a tube scanner element having a scanner end capable of motion relative to said frame in response to signals applied to said scanner element;
   a cantilever having a reflective back surface, a first cantilever end and a second cantilever end, said first cantilever end having a sharp probe tip extending therefrom toward said sample stage;
   at least one beam tracking lens fixed in operation to a portion of said scanner element;
   a source of a beam of radiant energy including a diode laser module, said source fixed in operation to said frame, said source arranged to project said beam of radiant energy through said at least one beam tracking lens and to said reflective back surface of said cantilever forming a reflected beam of radiant energy emanating from said reflective back surface; and
   a position sensitive photodetector fixed in operation to said frame and positioned to intercept said reflected beam of radiant energy and produce a signal responsive to angular movement of said reflected beam of radiant energy.

31. An atomic force microscope according to claim 30 wherein said position sensitive photodetector further includes means for adjusting the position of said position sensitive detector with respect to said frame.

32. An atomic force microscope according to claim 30 wherein said source further includes means for adjusting the position of said source with respect to said frame.

33. An atomic force microscope for examining the surface properties of a sample surface, said atomic force microscope comprising:
   a frame;
   a sample stage disposed under a portion of said frame;
   a tube scanner element having a scanner end capable of motion relative to said frame in response to signals applied to said scanner element;
   a cantilever having a reflective back surface, a first cantilever end and a second cantilever end, said first cantilever end having a sharp probe tip extending therefrom toward said sample stage;
   a source of a beam of radiant energy, said source fixed in operation to said frame, said source arranged to project said beam of radiant energy to said reflective back surface of said cantilever forming a reflected beam of radiant energy emanating from said reflective back surface; and
   a position sensitive photodetector fixed in operation to said frame and positioned to intercept said reflected beam of radiant energy and produce a signal responsive to angular movement of said reflected beam of radiant energy.

34. A scanning probe microscope for examining the surface properties of a sample surface, said scanning probe microscope comprising:
   a frame;
   a sample stage having an upper surface for supporting a sample, said sample stage disposed under a portion of said frame wherein said upper surface of said sample stage is not in contact with said frame;
   a tube scanner element having a scanner end capable of motion relative to said frame in response to signals applied to said scanner element;
   and a scanning probe for interacting with the sample surface disposed on said sample stage, said scanning probe suspended from said tube scanner.

35. A scanning probe microscope for examining the surface properties of a sample surface, said scanning probe microscope comprising:
   a frame;
   a sample stage disposed under a portion of said frame;
   an S-shaped piezoceramic tube scanner element having a scanner end capable of motion relative to said frame in response to signals applied to said scanner element; and
   a scanning probe for interacting with the sample surface disposed on said sample stage, said scanning probe suspended from said tube scanner.

36. An atomic force microscope for examining the surface properties of a sample surface, said atomic force microscope comprising:
   a frame;
   a sample stage disposed under a portion of said frame;
   a piezoceramic tube scanner element having a scanner end capable of motion relative to said frame in response to signals applied to said scanner element; and
   a scanning probe for interacting with the sample surface disposed on said sample stage, said scanning probe suspended from said tube scanner.

37. An atomic force microscope for examining the surface properties of a sample surface, said atomic force microscope comprising:
   a frame;
   a sample stage disposed under a portion of said frame;
   a tube scanner element having a scanner end capable of motion relative to said frame in response to signals applied to said scanner element; and
   a scanning probe for interacting with the sample surface disposed on said sample stage, said scanning probe suspended from said tube scanner.

* * * * *

UNITED STATES PATENT AND TRADEMARK OFFICE
CERTIFICATE OF CORRECTION

PATENT NO. : 5,587,523
DATED : December 24, 1996
INVENTOR(S) : Pan S. Jung, Daphne R. Yaniv It is certified that error appears in the above-indentified patent and that said Letters Patent is hereby corrected as shown below:

On the title page, under item [56],

---In the "Other Publications" section, replace "Basett" with --Baselt--.

---In the "Other Publications" section, replace "Van der Worf" with --Van der Werf--.

---In the "Other Publications" section, replace "P.S. Jung, "Novel Stationary-Sample Atomic Force Microscope with Beam-Tracking Lens", Dec. 14, 1992." with --P.S. Jung et al., "Novel Stationary-Sample Atomic Force Microscope with Beam-Tracking Lens", Electronic Letters, vol. 19 No. 3, 4 Feb. 1993, pp. 264-265.--.

---In the "Other Publications" section, in the publication by Stephen A. Joyce, replace "Relaxtion" with --Relaxation--.

---In the "Other Publications" section, replace "Richard Sonnenfield" with --Richard Sonnenfeld--.

---In the "Other Publications" section, replace "P. Davidson" with --P. Davidsson--.

---In the "Other Publications" section, before "Paul West" delete "Exhibit B".

---In the "Other Publications" section, before "John Adam Kramer" delete "Exhibit A".

UNITED STATES PATENT AND TRADEMARK OFFICE
CERTIFICATE OF CORRECTION

PATENT NO. : 5,587,523
DATED : December 24, 1996
INVENTOR(S) : Pan S. Jung, Daphne R. Yaniv It is certified that error appears in the above-indentified patent and that said Letters Patent is hereby corrected as shown below:

---In the "Other Publications" section, after "C. Mathew Mate, "Research Report--Determination of Lubricant Film Thickness on A Particulate Disk Surface by Atomic Force Microscopy"," insert the text --Magnetic Recording RJ 6789 (64857)--.

---In the "Other Publications" section, replace "Inga Holl Musselman, "Platinum/Iridium Tips with Controlled Geometry Tunneling Microscopy", J. Vac. Sci. Technol. A, vol. 8(4), pp. 3558-3562 Jul/Aug. 1990." with --Inga Holl Musselman, "Platinum/Iridium Tips with Controlled Geometry for Scanning Tunneling Microscopy", J. Vac. Sci. Technol. A, vol 8(4), pp. 3570-3575, Jul./Aug. 1990.--.

---In the "Other Publications" section, replace "L. A. Nagahara, "Preparation and Characterization of STM Tips for Electrochemical Studies" with --L. A. Nagahara, "Preparation and Characterization of STM Tips for Electrochemical Studies", Rev. Sci. Instrum. 60(10), pp. 3128-3130, October 1989.--

---On Col. 2, line 19, replace "Supra" with --*supra*--.

---On Col. 2, line 27, replace "in situ" with --*in situ*--.

---On Col. 5, line 42, replace "," with --.--.

---On Col. 3, line 2, replace "method" with --methods--.

UNITED STATES PATENT AND TRADEMARK OFFICE
CERTIFICATE OF CORRECTION

PATENT NO. : 5,587,523
DATED : December 24, 1996
INVENTOR(S) : Pan S. Jung, Daphne R. Yaniv It is certified that error appears in the above-indentified patent and that said Letters Patent is hereby corrected as shown below:

---On Col. 3, line 42, replace "method" with --methods--.

---On Col. 3, line 51, replace "as" with --an--.

---On Col. 5, line 22, after "probe" delete "or tip".

---On Col. 5, line 52, replace "a sharp-pointed probe tip 24" with --a sharp-pointed tip of probe 24--.

---On Col. 5, line 55, replace "probe tip 24" with --tip of probe 24 and--.

---On Col. 5, line 57, replace "probe tip 24" with --tip of probe 24--.

---On Col. 6, line 49, after "detector orientation" insert --is observed--.

---On Col. 8, line 27, replace "as" with --an--.

---On Col. 10, line 2, replace "postion" with --position--.

Signed and Sealed this

Twenty-ninth Day of April, 1997

Attest:

BRUCE LEHMAN

Attesting Officer

Commissioner of Patents and Trademarks